(12) United States Patent
Dubreuil et al.

(10) Patent No.: US 11,597,884 B2
(45) Date of Patent: Mar. 7, 2023

(54) TWO-STAGE HYDROCRACKING PROCESS COMPRISING A HYDROGENATION STAGE UPSTREAM OF THE SECOND HYDROCRACKING STAGE, FOR THE PRODUCTION OF MIDDLE DISTILLATES

(71) Applicant: IFP Energies nouvelles, Rueil-Malmaison (FR)

(72) Inventors: Anne-Claire Dubreuil, Rueil-Malmaison (FR); Gerhard Pirngruber, Rueil-Malmaison (FR); Emmanuelle Guillon, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 17/420,760

(22) PCT Filed: Jan. 2, 2020

(86) PCT No.: PCT/EP2020/050015
§ 371 (c)(1),
(2) Date: Jul. 6, 2021

(87) PCT Pub. No.: WO2020/144096
PCT Pub. Date: Jul. 16, 2020

(65) Prior Publication Data
US 2022/0112435 A1      Apr. 14, 2022

(30) Foreign Application Priority Data
Jan. 9, 2019   (FR) ..................... 19/00.205

(51) Int. Cl.
*C10G 65/12* (2006.01)
*C10G 7/00* (2006.01)
*C10G 45/48* (2006.01)
*C10G 45/72* (2006.01)
*C10G 47/36* (2006.01)

(52) U.S. Cl.
CPC ............. *C10G 65/12* (2013.01); *C10G 7/00* (2013.01); *C10G 45/48* (2013.01); *C10G 45/72* (2013.01); *C10G 47/36* (2013.01); *C10G 2300/4006* (2013.01); *C10G 2300/4012* (2013.01); *C10G 2300/4018* (2013.01); *C10G 2300/4025* (2013.01)

(58) Field of Classification Search
CPC .................................. C10G 65/12; C10G 7/00
See application file for complete search history.

(56) References Cited

U.S. PATENT DOCUMENTS

| 2017/0349844 A1 | 12/2017 | Sauge et al. |
| 2017/0362516 A1* | 12/2017 | Wang .................... C10G 65/12 |
| 2018/0362864 A1* | 12/2018 | Verstraete ............. C10G 47/00 |

FOREIGN PATENT DOCUMENTS

| FR | 3030564 A1 | 6/2016 |
| FR | 3067717 A1 | 12/2018 |

OTHER PUBLICATIONS

International Search Report for PCT/EP2020/050015 dated Jan. 28, 2020.

* cited by examiner

*Primary Examiner* — Randy Boyer
(74) *Attorney, Agent, or Firm* — Millen, White, Zelano and Branigan, P.C.; Harry B. Shubin (57) ABSTRACT

The present invention is based on the use of a two-step hydrocracking process comprising a step of hydrogenation placed upstream of the second hydrocracking step, the hydrogenation step treating the unconverted liquid fraction separated in the distillation step in the presence of a specific hydrogenation catalyst. Furthermore, the hydrogenation step and second hydrocracking step are carried out under specific operating conditions and in particular under very specific temperature conditions.

13 Claims, 1 Drawing Sheet

TWO-STAGE HYDROCRACKING PROCESS COMPRISING A HYDROGENATION STAGE UPSTREAM OF THE SECOND HYDROCRACKING STAGE, FOR THE PRODUCTION OF MIDDLE DISTILLATES

TECHNICAL FIELD OF THE INVENTION

The invention relates to a two-step hydrocracking process that makes it possible to eliminate the heavy polycyclic aromatic compounds (HPNAs) without reducing the yield of upgradable products.

Hydrocracking processes are commonly used in a refinery for transforming hydrocarbon mixtures into easily upgradable products. These processes may be used to transform light cuts such as for example petroleums into lighter cuts (LPG). However, they are customarily used more for converting heavier feedstocks (such as heavy synthetic or petroleum cuts, for example gas oils resulting from vacuum distillation or effluents from a Fischer-Tropsch unit) into petroleum or naphtha, kerosene, gas oil.

Certain hydrocracking processes make it possible to also obtain a highly purified residue that may constitute excellent bases for oils. One of the effluents that is particularly targeted by the hydrocracking process is middle distillate (fraction which contains the gas oil cut and the kerosene cut), i.e. cuts with an initial boiling point of at least 150° C. and with a final boiling point below the initial boiling point of the residue, for example below 340° C., or else below 370° C.

Hydrocracking is a process which draws its flexibility from three main elements which are: the operating conditions used, the types of catalysts employed and the fact that the hydrocracking of hydrocarbon feedstocks may be carried out in one step or in two steps.

In particular, the hydrocracking of vacuum distillates or VDs makes it possible to produce light cuts (gas oil, kerosene, naphthas, and the like) which are more upgradable than the VD itself. This catalytic process does not make it possible to completely convert the VD into light cuts. After fractionation, there thus remains a more or less significant proportion of unconverted VD fraction, referred to as UCO or UnConverted Oil. To increase the conversion, this unconverted fraction may be recycled to the inlet of the hydrotreating reactor or to the inlet of the hydrocracking reactor in the case of a one-step hydrocracking process or to the inlet of a second hydrocracking reactor treating the unconverted fraction at the end of the fractionating step, in the case of a two-step hydrocracking process.

It is known that the recycling of said unconverted fraction resulting from the fractionating step to the second hydrocracking step of a two-step process results in the formation of heavy (polycyclic) aromatic compounds referred to as HPNAs during the cracking reactions and thus in the undesirable accumulation of said compounds in the recycle loop, resulting in the degradation of the performance of the catalyst of the second hydrocracking step and/or in the fouling thereof. A purge is generally installed in the recycling of said unconverted fraction, in general in the fractionation bottoms line, in order to reduce the concentration, in the recycling, of HPNA compounds, the purge flow rate being adjusted so as to balance the formation flow rate thereof. Specifically, the heavier the HPNAs, the greater their tendency to remain in this loop, to accumulate, and to grow heavier.

However, the overall conversion of a two-step hydrocracking process is directly linked to the amount of heavy products purged at the same time as the HPNAs. This purging therefore leads to a loss of upgradable products which are also extracted with the HPNAs via this purge.

Depending on the operating conditions of the process, said purge may be between 0 and 5% by weight of the unconverted heavy fraction (UCO) relative to the incoming VD mother feedstock, and preferably between 0.5% and 3% by weight. The yield of upgradable products is therefore reduced accordingly, which constitutes a not inconsiderable economic loss for the refiner.

Throughout the remainder of the text, the HPNA compounds are defined as polycyclic or polynuclear aromatic compounds which therefore comprise several fused benzene nuclei or rings. They are customarily referred to as PNAs, Polynuclear Aromatics, for the lightest of them and as HPAs or HPNAs, Heavy PolyNuclear Aromatics, for the compounds comprising at least seven aromatic nuclei (such as for example coronene, compound with 7 aromatic rings). These compounds, formed during undesirable secondary reactions, are stable and very difficult to hydrocrack.

PRIOR ART

There are various patents that relate to processes which seek to specifically treat the problem linked to HPNAs so that they are not detrimental to the process simultaneously in terms of performance, cycle time and operability.

Certain patents claim the elimination of HPNA compounds by fractionation, distillation, solvent extraction or adsorption on a trapping mass (WO2016/102302, U.S. Pat. Nos. 8,852,404, 9,580,663, 5,464,526 and 4,775,460).

Another technique consists in hydrogenating the effluents containing the HPNAs in order to limit the formation and accumulation thereof in the recycle loop.

U.S. Pat. No. 3,929,618 describes a process for hydrogenating and opening the rings of hydrocarbon feedstocks containing fused polycyclic hydrocarbons in the presence of a catalyst based on NaY zeolite and exchanged with nickel.

U.S. Pat. No. 4,931,165 describes a one-step hydrocracking process with recycling comprising a step of hydrogenation over the recycle loop of the gases.

U.S. Pat. No. 4,618,412 describes a one-step hydrocracking process in which the unconverted effluent resulting from the hydrocracking step containing HPNAs is sent to a step of hydrogenation over a catalyst based on iron and on alkali or alkaline-earth metals, at temperatures of between 225° C. and 430° C. before being recycled to the hydrocracking step.

U.S. Pat. No. 5,007,998 describes a one-step hydrocracking process in which the unconverted effluent resulting from the hydrocracking step containing HPNAs is sent to a step of hydrogenation over a zeolitic hydrogenation catalyst (zeolite with pore sizes between 8 and 15 Å) also comprising a hydrogenation component and a clay.

U.S. Pat. No. 5,139,644 describes a process similar to that of U.S. Pat. No. 5,007,998 with a coupling to a step of adsorption of the HPNAs on an adsorbent.

U.S. Pat. No. 5,364,514 describes a conversion process comprising a first hydrocracking step, the effluent resulting from this first step then being split into two effluents. A portion of the effluent resulting from the first hydrocracking step is sent to a second hydrocracking step while the other portion of the effluent resulting from the first hydrocracking step is sent simultaneously to a step of hydrogenation of aromatics using a catalyst comprising at least one noble metal from group VIII on an amorphous or crystalline support. The effluents produced in said hydrogenation step and second hydrocracking step are then sent to the same separation step or to dedicated separation steps.

Patent application US2017/362516 describes a two-step hydrocracking process comprising a first hydrocracking step followed by fractionation of the hydrocracked stream producing an unconverted effluent comprising HPNAs which is recycled and referred to as the recycle stream. This recycle stream is then sent to a hydrotreating step which enables the saturation, by hydrogenation, of the HPNA aromatic compounds. This hydrotreating step produces a hydrogenated stream which is then sent to a second hydrocracking step.

The essential criterion of the invention of US2017/362516 lies in the fact that the hydrotreating step that enables the hydrogenation of the HPNAs is located upstream of the second hydrocracking step. The hydrotreating step and the second hydrocracking step may be carried out in two different reactors or in the same reactor. When they are carried out in the same reactor, said reactor comprises a first catalyst bed comprising the hydrotreating catalyst that enables the saturation of the aromatics, followed by catalyst beds comprising the hydrocracking catalyst of the second step.

The hydrotreating catalyst used is a catalyst comprising at least one group VIII metal and preferably a group VIII noble metal comprising rhenium, ruthenium, rhodium, palladium, silver, osmium, iridium, platinum and/or gold, it being possible for said catalyst to optionally also comprise at least one non-noble metal and preferably cobalt, nickel, vanadium, molybdenum and/or tungsten, supported preferably on alumina. Other zeolitic catalysts and/or hydrogenation catalysts that are not supported may be used.

The research studies carried out by the applicant have led the applicant to discover an improved use of the hydrocracking process which makes it possible to limit the formation of HPNA in the second step of a two-step hydrocracking scheme and therefore to increase the cycle time of the process by limiting the deactivation of the hydrocracking catalyst. Another advantage of the present invention makes it possible to minimize the purge and therefore to maximize the upgradable products.

The present invention is based on the use of a two-step hydrocracking process comprising a step of hydrogenation placed upstream of the second hydrocracking step, the hydrogenation step treating the unconverted liquid fraction separated in the distillation step in the presence of a specific hydrogenation catalyst. Furthermore, the hydrogenation step and second hydrocracking step are carried out under specific operating conditions and in particular under very specific temperature conditions.

SUMMARY OF THE INVENTION

In particular, the present invention relates to a process for producing middle distillates from hydrocarbon feedstocks containing at least 20% by volume and preferably at least 80% by volume of compounds boiling above 340° C., said process comprising and preferably consisting of at least the following steps:

a) a step of hydrotreating said feedstocks in the presence of hydrogen and at least one hydrotreating catalyst, at a temperature of between 200° C. and 450° C., under a pressure of between 2 and 25 MPa, at a space velocity of between 0.1 and 6 $h^{-1}$ and with an amount of hydrogen introduced such that the litre of hydrogen/litre of hydrocarbon volume ratio is between 100 and 2000 Nl/l, b) a step of hydrocracking at least one portion of the effluent resulting from step a), the hydrocracking step b) taking place, in the presence of hydrogen and at least one hydrocracking catalyst, at a temperature of between 250° C. and 480° C., under a pressure of between 2 and 25 MPa, at a space velocity of between 0.1 and 6 $h^{-1}$ and with an amount of hydrogen introduced such that the litre of hydrogen/litre of hydrocarbon volume ratio is between 80 and 2000 Nl/l, c) a step of high-pressure separation of the effluent resulting from the hydrocracking step b) to produce at least a gaseous effluent and a liquid hydrocarbon effluent, d) a step of distilling at least one portion of the liquid hydrocarbon effluent resulting from step c) carried out in at least one distillation column, from which step the following are drawn off:
  a gaseous fraction,
  at least one petroleum fraction having at least 80% by volume of products boiling at a temperature below 150° C.,
  at least one middle distillates fraction having at least 80% by volume of products having a boiling point between 150° C. and 380° C., preferably between 150° C. and 370° C. and preferably between 150° C. and 350° C.,
  an unconverted heavy liquid fraction having at least 80% by volume of products having a boiling point above 350° C., preferably above 370° C., preferably above 380° C., e) optionally a purging of at least one portion of said unconverted heavy liquid fraction containing HPNAs, having at least 80% by volume of products having a boiling point above 350° C., before the introduction thereof into step f), f) a step of hydrogenating at least one portion of the unconverted heavy liquid fraction having at least 80% by volume of products having a boiling point above 350° C. resulting from step d) and optionally purged, said step f) taking place, in the presence of hydrogen and a hydrogenation catalyst, at a temperature TR1 of between 150° C. and 470° C., under a pressure of between 2 and 25 MPa, at a space velocity of between 0.1 and 50 $h^{-1}$ and with an amount of hydrogen introduced such that the litre of hydrogen/litre of hydrocarbon volume ratio is between 100 and 4000 Nl/l, said hydrogenation catalyst comprising and preferably consisting of at least one non-noble metal from group VIII of the Periodic Table chosen from nickel, cobalt, iron, alone or as a mixture and not comprising any noble metal from group VIII, or metal from group VIB, and a support chosen from refractory oxide supports, g) a second step of hydrocracking at least one portion of the effluent resulting from step f), said step g) taking place, in the presence of hydrogen and at least one second hydrocracking catalyst, at a temperature TR2 of between 250° C. and 480° C., under a pressure of between 2 and 25 MPa, at a space velocity of between 0.1 and 6 $h^{-1}$ and with an amount of hydrogen introduced such that the litre of hydrogen/litre of hydrocarbon volume ratio is between 80 and 2000 Nl/l, and in which the temperature TR2 is at least 10° C. higher than the temperature TR1, h) a step of high-pressure separation of the effluent resulting from the hydrocracking step g) to produce at least a gaseous effluent and a liquid hydrocarbon effluent, i) recycling, to said distillation step d), at least one portion of the liquid hydrocarbon effluent resulting from step h).

The temperature expressed for each step is preferably a weighted average temperature over all of the catalyst bed(s), or WABT, for example as defined in the book "Hydroprocessing of Heavy Oils and Residua", Jorge Ancheyta, James G. Speight—2007—Science.

Feedstocks

The present invention relates to a process for hydrocracking hydrocarbon feedstocks referred to as mother feedstock, containing at least 20% by volume, and preferably at least 80% by volume, of compounds boiling above 340° C., preferably above 350° C. and preferably between 350° C. and 580° C. (i.e. corresponding to compounds containing at least 15 to 20 carbon atoms).

Said hydrocarbon feedstocks may advantageously be chosen from VGOs (vacuum gas oils) or vacuum distillates (VDs) or gas oils, such as for example the gas oils resulting from the direct distillation of crude or from conversion units, such as FCC (for example LCO or Light Cycle Oil), coker or visbreaking units, and also feedstocks originating from units for the extraction of aromatics from lubricating oil bases or resulting from the solvent dewaxing of lubricating oil bases, or else distillates originating from the desulfurization or hydroconversion of ATRs (atmospheric residues) and/or VRs (vacuum residues), or else the feedstock may advantageously be a deasphalted oil, or feedstocks resulting from biomass or else any mixture of the abovementioned feedstocks, and preferably VGOs.

Paraffins resulting from the Fischer-Tropsch process are excluded.

The nitrogen content of the mother feedstocks treated in the process according to the invention is usually greater than 500 ppm by weight, preferably between 500 and 10 000 ppm by weight, more preferably between 700 and 4000 ppm by weight and more preferably still between 1000 and 4000 ppm by weight. The sulfur content of the mother feedstocks treated in the process according to the invention is usually between 0.01% and 5% by weight, preferably between 0.2% and 4% by weight and more preferably still between 0.5% and 3% by weight.

The feedstock may optionally contain metals. The cumulative content of nickel and vanadium of the feedstocks treated in the process according to the invention is preferably less than 1 ppm by weight.

The feedstock may optionally contain asphaltenes. The asphaltenes content is generally less than 3000 ppm by weight, preferably less than 1000 ppm by weight and more preferably still less than 200 ppm by weight.

In the case where the feedstock contains compounds of resin and/or asphaltene type, it is advantageous to pass the feedstock beforehand over a bed of catalyst or of adsorbent different from the hydrocracking or hydrotreating catalyst.

Step a)

In accordance with the invention, the process comprises a step a) of hydrotreating said feedstocks in the presence of hydrogen and at least one hydrotreating catalyst, at a temperature of between 200° C. and 450° C., under a pressure of between 2 and 25 MPa, at a space velocity of between 0.1 and 6 $h^{-1}$ and with an amount of hydrogen introduced such that the litre of hydrogen/litre of hydrocarbon volume ratio is between 100 and 2000 Nl/l.

The operating conditions such as temperature, pressure, degree of hydrogen recycling or hourly space velocity, can be highly variable depending on the nature of the feedstock, on the quality of the products desired and on the plants which the refiner has available.

Preferably, the hydrotreating step a) according to the invention takes place at a temperature of between 250° C. and 450° C., very preferably between 300° C. and 430° C., under a pressure of between 5 and 20 MPa, at a space velocity of between 0.2 and 5 $h^{-1}$ and with an amount of hydrogen introduced such that the litre of hydrogen/litre of hydrocarbon volume ratio is between 300 and 1500 Nl/l.

Conventional hydrotreating catalysts can advantageously be used, preferably which contain at least one amorphous support and at least one hydrogenating-dehydrogenating element chosen from at least one non-noble element from groups VIB and VIII, and generally at least one element from group VIB and at least one non-noble element from group VIII.

Preferably, the amorphous support is alumina or silica-alumina.

Preferred catalysts are chosen from the catalysts NiMo, NiW or CoMo on alumina, and NiMo or NiW on silica-alumina.

The effluent resulting from the hydrotreating step and a portion of which enters the hydrocracking step b) generally comprises a nitrogen content preferably of less than 300 ppm by weight and preferably of less than 50 ppm by weight.

Step b)

In accordance with the invention, the process comprises a step b) of hydrocracking at least one portion of the effluent resulting from step a), and preferably all thereof, said step b) taking place, in the presence of hydrogen and at least one hydrocracking catalyst, at a temperature of between 250° C. and 480° C., under a pressure of between 2 and 25 MPa, at a space velocity of between 0.1 and 6 $h^{-1}$ and with an amount of hydrogen introduced such that the litre of hydrogen/litre of hydrocarbon volume ratio is between 80 and 2000 Nl/l.

Preferably, the hydrocracking step b) according to the invention takes place at a temperature of between 320° C. and 450° C., very preferably between 330° C. and 435° C., under a pressure of between 3 and 20 MPa, at a space velocity of between 0.2 and 4 $h^{-1}$ and with an amount of hydrogen introduced such that the litre of hydrogen/litre of hydrocarbon volume ratio is between 200 and 2000 Nl/l.

In one embodiment that makes it possible to maximize the production of middle distillates, the operating conditions used in the process according to the invention generally make it possible to obtain conversions per pass, into products having at least 80% by volume of products having boiling points below 380° C., preferably below 370° C., and preferably below 350° C., of greater than 15% by weight and more preferably still of between 20% and 95% by weight.

The hydrocracking step b) according to the invention covers the pressure and conversion ranges extending from mild hydrocracking to high-pressure hydrocracking. Mild hydrocracking is understood to mean a hydrocracking that results in moderate conversions, generally of less than 40%, and that operates at low pressure, preferably between 2 MPa and 6 MPa. High-pressure hydrocracking is generally carried out at greater pressures between 5 MPa and 25 MPa, so as to obtain conversions of greater than 50%.

The hydrotreating step a) and the hydrocracking step b) may advantageously be carried out in the same reactor or in different reactors. When they are carried out in the same reactor, the reactor comprises several catalyst beds, the first catalyst beds comprising the hydrotreating catalyst(s) and the following catalyst beds comprising the hydrocracking catalyst(s).

Catalyst of the Hydrocracking Step b)

In accordance with the invention, the hydrocracking step b) is carried out in the presence of at least one hydrocracking catalyst.

The hydrocracking catalyst(s) used in the hydrocracking step b) are conventional hydrocracking catalysts known to a person skilled in the art, of bifunctional type combining an acid function with a hydrogenating-dehydrogenating function and optionally at least one binder matrix. The acid function is provided by supports having a large surface area (150 to 800 m$^2 \cdot$g$^{-1}$ generally) exhibiting a surface acidity, such as halogenated (in particular chlorinated or fluorinated) aluminas, combinations of boron and aluminium oxides, amorphous silica-aluminas and zeolites. The hydrogenating-dehydrogenating function is provided by at least one metal from group VIB of the Periodic Table and/or at least one metal from group VIII.

Preferably, the hydrocracking catalyst(s) used in step b) comprise a hydrogenating-dehydrogenating function comprising at least one metal from group VIII chosen from iron, cobalt, nickel, ruthenium, rhodium, palladium and platinum, and preferably from cobalt and nickel. Preferably, said catalyst(s) also comprise(s) at least one metal from group VIB chosen from chromium, molybdenum and tungsten, alone or as a mixture, and preferably from molybdenum and tungsten. Hydrogenating-dehydrogenating functions of NiMo, NiMoW, NiW type are preferred.

Preferably, the content of metal from group VIII in the hydrocracking catalyst(s) is advantageously between 0.5% and 15% by weight and preferably between 1% and 10% by weight, the percentages being expressed as percentage by weight of oxides relative to the total weight of catalyst.

Preferably, the content of metal from group VIB in the hydrocracking catalyst(s) is advantageously between 5% and 35% by weight and preferably between 10% and 30% by weight, the percentages being expressed as percentage by weight of oxides relative to the total weight of catalyst.

The hydrocracking catalyst(s) used in step b) may also optionally comprise at least one promoter element deposited on the catalyst and chosen from the group formed by phosphorus, boron and silicon, optionally at least one element from group VIIA (chlorine, fluorine are preferred), optionally at least one element from group VIIB (manganese preferred), and optionally at least one element from group VB (niobium preferred).

Preferably, the hydrocracking catalyst(s) used in step b) comprise(s) at least one amorphous or poorly crystallized porous mineral matrix of oxide type chosen from aluminas, silicas, silica-aluminas, aluminates, alumina-boron oxide, magnesia, silica-magnesia, zirconia, titanium oxide or clay, alone or as a mixture, and preferably aluminas or silica-aluminas, alone or as a mixture.

Preferably, the silica-alumina contains more than 50% by weight of alumina, preferably more than 60% by weight of alumina.

Preferably, the hydrocracking catalyst(s) used in step b) also optionally comprise(s) a zeolite chosen from Y zeolites, preferably from USY zeolites, alone or in combination with other zeolites from beta, ZSM-12, IZM-2, ZSM-22, ZSM-23, SAPO-11, ZSM-48 or ZBM-30 zeolites, alone or as a mixture. Preferably, the zeolite is the USY zeolite alone.

When said catalyst comprises a zeolite, the content of zeolite in the hydrocracking catalyst(s) is advantageously between 0.1% and 80% by weight, preferably between 3% and 70% by weight, the percentages being expressed as percentage of zeolite relative to the total weight of catalyst.

A preferred catalyst comprises, and preferably consists of, at least one metal from group VIB and optionally at least one non-noble metal from group VIII, at least one promoter element, and preferably phosphorus, at least one Y zeolite and at least one alumina binder.

An even more preferred catalyst comprises, and preferably consists of, nickel, molybdenum, phosphorus, a USY zeolite, and optionally also a beta zeolite, and alumina.

Another preferred catalyst comprises, and preferably consists of, nickel, tungsten, alumina and silica-alumina.

Another preferred catalyst comprises, and preferably consists of, nickel, tungsten, a USY zeolite, alumina and silica-alumina.

Step c)

In accordance with the invention, the process comprises a high-pressure separation step c) comprising a separation means such as for example a series of disengagers at high pressure operating between 2 and 25 MPa, the purpose of which is to produce a stream of hydrogen which is recycled by means of a compressor to at least one of the steps a), b), f) and/or g), and a hydrocarbon effluent produced in the hydrocracking step b) which is preferentially sent to a steam stripping step preferably operating at a pressure of between 0.5 and 2 MPa, the purpose of which is to carry out a separation of the hydrogen sulfide (H$_2$S) dissolved in at least said hydrocarbon effluent produced in step b).

Step c) enables the production of a liquid hydrocarbon effluent which is then sent to the distillation step d).

Step d)

In accordance with the invention, the process comprises a step d) of distilling the effluent resulting from step c) to give at least one C1-04 light gases fraction, at least one petroleum fraction having at least 80% by volume, preferably at least 95% by volume, of products boiling at a temperature below 150° C., at least one middle distillates (kerosene and gas oil) fraction having at least 80% by volume, and preferably at least 95% by volume, of compounds boiling between 150° C. and 380° C., preferably between 150° C. and 370° C. and preferably between 150° C. and 350° C., and a heavy liquid fraction not converted in steps a) and b), having at least 80% by volume and preferably at least 95% by volume of products having a boiling point above 350° C., preferably above 370° C., preferably above 380° C.

A gas oil fraction and a kerosene fraction may advantageously then be separated.

Optional Step e)

The process may optionally comprise a step e) of purging at least one portion of said unconverted heavy liquid fraction containing HPNAs, resulting from the distillation step d).

Said purge is between 0 and 5% by weight of the unconverted heavy liquid fraction relative to the feedstock entering said process, and preferably between 0 and 3% by weight and very preferably between 0 and 2% by weight.

Step f)

In accordance with the invention, the process comprises a step f) of hydrogenating at least one portion of the unconverted heavy liquid fraction having at least 80% by volume of products having a boiling point above 350° C. resulting from step d) and optionally purged, taking place in the presence of hydrogen and a hydrogenation catalyst, at a temperature TR1 of between 150° C. and 470° C., under a pressure of between 2 and 25 MPa, at a space velocity of between 0.1 and 50 h$^{-1}$ and with an amount of hydrogen introduced such that the litre of hydrogen/litre of hydrocarbon volume ratio is between 100 and 4000 Nl/l, said hydrogenation catalyst comprising and preferably consisting of at least one non-noble metal from group VIII of the Periodic Table chosen from nickel, cobalt, iron, alone or as a mixture, and a support chosen from refractory oxide supports, said catalyst not comprising any noble metal from group VIII, or metal from group VIB.

Preferably, said hydrogenation step f) takes place at a temperature TR1 of between 150° C. and 380° C., preferably between 180° C. and 320° C., under a pressure of between 3 and 20 MPa, and very preferably between 9 and 20 MPa, at a space velocity of between 0.2 and 10 h$^{-1}$ and with an amount of hydrogen introduced such that the litre of hydrogen/litre of hydrocarbon volume ratio is between 200 and 3000 Nl/l.

Preferably, the content of nitrogen in step f), whether this is organic nitrogen dissolved in said unconverted heavy liquid fraction or the $NH_3$ present in the gas phase, is low, preferably less than 200 ppm by weight, preferably less than 100 ppm by weight, more preferably less than 50 ppm by weight.

Preferably, the partial pressure of $H_2S$ of step f) is low, preferably the content of equivalent sulfur is less than 800 ppm by weight, preferably between 10 and 500 ppm by weight, more preferably between 20 and 400 ppm by weight.

The technological implementation of the hydrogenation step f) is carried out according to any implementation known to a person skilled in the art, for example by injection, in upflow or downflow, of at least one portion of the unconverted heavy liquid fraction resulting from step d) and optionally purged, and hydrogen, into at least one fixed bed reactor. Said reactor may be of isothermal type or of adiabatic type. An adiabatic reactor is preferred. The hydrocarbon feedstock may advantageously be diluted by one or more reinjection(s) of the effluent, resulting from said reactor where the hydrogenation reaction takes place, at various points of the reactor, located between the inlet and the outlet of the reactor, in order to limit the temperature gradient in the reactor. The stream of hydrogen may be introduced at the same time as the feedstock to be hydrogenated and/or at one or more different points of the reactor.

Preferably, the non-noble metal from group VIII used in the hydrogenation catalyst is chosen from nickel, cobalt, iron, alone or as a mixture. Preferably, the non-noble metal from group VIII is nickel.

The content of non-noble metallic element from group VIII in said catalyst is advantageously between 5% and 65% by weight, more preferentially between 8% and 55% by weight, and more preferentially still between 12% and 40% by weight, and more preferably still between 15% and 30% by weight, the percentages being expressed as percentage by weight of metallic element relative to the total weight of the catalyst.

Preferably, said hydrogenation catalyst does not comprise molybdenum or tungsten.

Preferably, the hydrogenation catalyst does not comprise platinum or palladium.

Said hydrogenation catalyst may further comprise at least one additional metal chosen from the elements from group IB and/or tin. Advantageously, the additional metal from group IB is chosen from copper, gold and silver. Said additional metal(s) from group IB is (are) preferentially present in a content representing from 0.01% to 20% by weight of the weight of the catalyst, preferably from 0.05% to 10% by weight of the weight of the catalyst and more preferably still from 0.05% to 5% by weight of the weight of said catalyst. The tin is preferentially present in a content representing from 0.02% to 15% by weight of the weight of the catalyst, so that the Sn/metal(s) from group VIII ratio is between 0.01 and 0.2, preferably between 0.025 and 0.055, and more preferably still between 0.03 and 0.05.

The support of said hydrogenation catalyst is advantageously formed of at least one refractory oxide preferentially chosen from the oxides of metals from groups IIA, IIIB, IVB, IIIA and IVA according to the CAS notation of the Periodic Table of the Elements. Preferably, said support is formed of at least one simple oxide chosen from alumina ($Al_2O_3$), silica ($SiO_2$), titanium oxide ($TiO_2$), ceria ($CeO_2$), zirconia ($ZrO_2$) or $P_2O_5$. Preferably, said support is chosen from aluminas, silicas and silicas-aluminas, alone or as a mixture. Very preferably, said support is an alumina or a silica-alumina, alone or as a mixture, and more preferably still an alumina. Preferably, the silica-alumina contains more than 50% by weight of alumina, preferably more than 60% by weight of alumina. The alumina may be present in all possible crystallographic forms: alpha, delta, theta, chi, rho, eta, kappa, gamma, etc., taken alone or as a mixture. Preferably, the support is chosen from delta, theta or gamma alumina.

The catalyst from the hydrogenation step f) may optionally comprise a zeolite chosen from Y zeolites, preferably USY zeolites, alone or in combination with other zeolites from beta, ZSM-12, IZM-2, ZSM-22, ZSM-23, SAPO-11, ZSM-48 or ZBM-30 zeolites, alone or as a mixture. Preferably, the zeolite is the USY zeolite alone.

Preferably, the catalyst of step f) does not contain zeolite.

A preferred catalyst is a catalyst comprising, and preferably consisting of, nickel and alumina.

Preferably, the hydrogenation catalysts of step f) is different from that used in the hydrotreating step a) and from those used in the hydrocracking steps b) and g).

The main objective of the hydrogenation step f) using a hydrogenation catalyst under operating conditions favourable to the hydrogenation reactions is to hydrogenate a portion of the aromatic or polyaromatic compounds contained in at least one portion of the unconverted heavy liquid fraction resulting from step d) and optionally purged, and in particular to reduce the content of HPNA compounds. However, reactions of desulfurization, of nitrogen removal, of hydrogenation of olefins or of mild hydrocracking are not excluded. The conversion of the aromatic or polyaromatic compounds is generally greater than 20%, preferably greater than 40%, more preferably greater than 80%, and particularly preferably greater than 90% of the aromatic or polyaromatic compounds contained in the hydrocarbon feedstock. The conversion is calculated by dividing the difference between the amounts of aromatic or polyaromatic compounds in the hydrocarbon feedstock and in the product by the amounts of aromatic or polyaromatic compounds in the hydrocarbon feedstock (the hydrocarbon feedstock being the portion of the unconverted heavy liquid fraction resulting from step d), and optionally purged, treated in step f) and the product being the effluent from step f)).

In the presence of the hydrogenation step f) according to the invention, the hydrocracking process has a lengthened cycle time and/or an improved yield of middle distillates.

Step g)

In accordance with the invention, the process comprises a second step g) of hydrocracking said effluent resulting from step f) taking place, in the presence of hydrogen and a hydrocracking catalyst, at a temperature TR2 of between 250° C. and 480° C., under a pressure of between 2 and 25 MPa, at a space velocity of between 0.1 and 6 h$^{-1}$ and with an amount of hydrogen introduced such that the litre of hydrogen/litre of hydrocarbon volume ratio is between 80 and 2000 Nl/l, in which the temperature TR2 is at least 10° C. higher than the temperature TR1.

Preferably, the hydrocracking step g) according to the invention takes place at a temperature of between 320° C. and 450° C., very preferably between 330° C. and 435° C., under a pressure of between 3 and 20 MPa, and very preferably between 9 and 20 MPa, at a space velocity of between 0.2 and 3 h$^{-1}$ and with an amount of hydrogen introduced such that the litre of hydrogen/litre of hydrocarbon volume ratio is between 200 and 2000 Nl/l.

Preferably, step g) is carried out at a temperature TR2 at least 20° C. higher than the temperature TR1, preferably at least 50° C. higher and more preferably at least 70° C. higher.

It is important to note that the temperatures TR1 and TR2 are chosen from the ranges mentioned above so as to comply with the delta temperature according to the present invention, namely that TR2 must be at least 20° C. higher than the temperature TR1, preferably at least 50° C. higher and more preferably at least 70° C. higher.

Preferably, the litre of hydrogen/litre of hydrocarbon volume ratio of step g) is lower than that of the hydrogenation step f).

These operating conditions used in step g) of the process according to the invention generally make it possible to obtain conversions per pass, into products having at least 80% by volume of compounds having boiling points below 380° C., preferably below 370° C. and preferably below 350° C., of greater than 15% by weight and more preferably still of between 20% and 80% by weight. Nevertheless, the conversion per pass in step g) is kept moderate in order to maximize the selectivity of the process to give products having boiling points of between 150° C. and 380° C. (middle distillates). The conversion per pass is limited by the use of a high recycle ratio over the second hydrocracking step loop. This ratio is defined as the ratio of the feed flow rate of step g) to the flow rate of the feedstock of step a); preferentially, this ratio is between 0.2 and 4, preferably between 0.5 and 2.5.

In accordance with the invention, the hydrocracking step g) is carried out in the presence of at least one hydrocracking catalyst. Preferably, the hydrocracking catalyst of the second step is chosen from conventional hydrocracking catalysts known to a person skilled in the art, such as those described above in the hydrocracking step b). The hydrocracking catalyst used in said step g) may be identical to or different from the one used in step b) and preferably different.

In a variant, the hydrocracking catalyst used in step g) comprises a hydrogenating-dehydrogenating function comprising at least one noble metal from group VIII chosen from palladium and platinum, alone or as a mixture. The content of noble metal from group VIII is advantageously between 0.01% and 5% by weight and preferably between 0.05% and 3% by weight, the percentages being expressed as percentage by weight of oxides relative to the total weight of catalyst.

The hydrogenation step f) and the hydrocracking step g) may advantageously be carried out in the same reactor or in different reactors. When they are carried out in the same reactor, the reactor comprises several catalyst beds, the first catalyst beds comprising the hydrogenation catalyst(s) and the following (i.e. downstream) catalyst beds comprising the hydrocracking catalyst(s). In a preferred embodiment of the invention, step f) and step g) are carried out in the same reactor.

Advantageously, the exothermicity generated by the hydrogenation step f) helps to raise the temperature to reach the temperature of the hydrocracking step g).

Step h)

In accordance with the invention, the process comprises a step h) of high-pressure separation of the effluent resulting from the hydrocracking step g) to produce at least a gaseous effluent and a liquid hydrocarbon effluent.

Said separation step h) advantageously comprises a separation means such as for example a series of disengagers at high pressure operating between 2 and 25 MPa, the purpose of which is to produce a stream of hydrogen which is recycled by means of a compressor to at least one of the steps a), b), f) and/or g), and a hydrocarbon effluent produced in the hydrocracking step g).

Step h) enables the production of a liquid hydrocarbon effluent which is then recycled to the distillation step d).

Advantageously, said step h) is carried out in one and the same step as the step c) or in a separate step.

Step i)

In accordance with the invention, the process comprises a step i) of recycling, to said distillation step d), at least one portion of the liquid hydrocarbon effluent resulting from step h).

Figure 1:
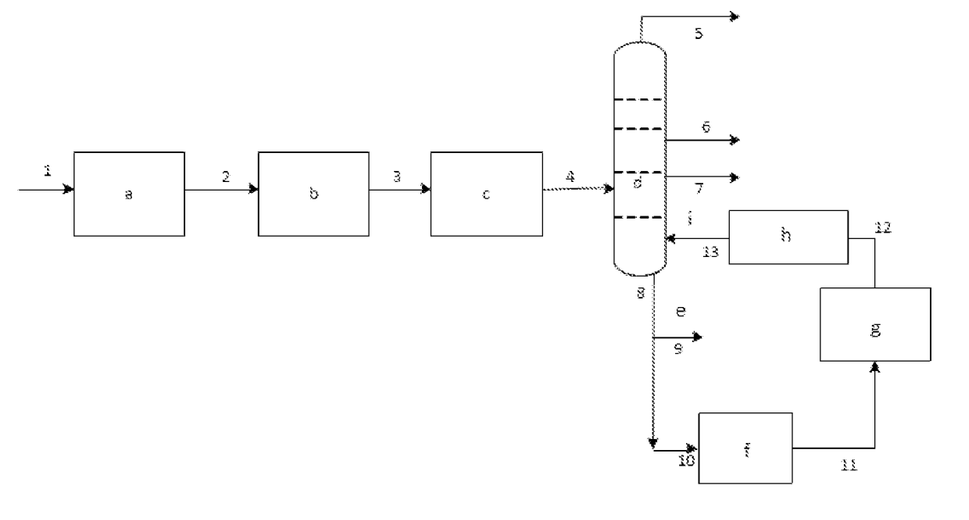
FIG. 1 illustrates an embodiment of the invention.

The VGO-type feedstock is sent via the pipe (1) to a hydrotreating step a). The effluent resulting from step a) is sent via the pipe (2) to a first hydrocracking step b). The effluent resulting from step b) is sent via the pipe (3) to a high-pressure separation step c) to produce at least a gaseous effluent (not represented in the FIGURE) and a liquid hydrocarbon effluent which is sent via the pipe (4) to the distillation step d). The following are drawn off from the distillation step d):
- a gaseous fraction (5),
- at least one petroleum fraction having at least 80% by volume of products boiling at a temperature below 150° C. (6),
- at least one middle distillates fraction having at least 80% by volume of products having a boiling point between 150° C. and 380° C. (7), and
- an unconverted heavy liquid fraction having at least 80% by volume of products having a boiling point above 350° C. (8).

Optionally, a portion of the unconverted heavy liquid fraction containing HPNAs is purged in a step e) via the pipe (9).

The purged unconverted heavy liquid fraction is sent via the pipe (10) to a hydrogenation step f). The hydrogenated effluent resulting from step f) is sent via the pipe (11) to the second hydrocracking step g). The effluent resulting from step g) is sent via the pipe (12) to a high-pressure separation step h) to produce at least a gaseous effluent (not represented in the FIGURE) and a liquid hydrocarbon effluent which is recycled via the pipe (13) to the distillation step d).

EXAMPLES

The following examples illustrate the invention without limiting the scope thereof.

Example No. 1 not in Accordance with the Invention: Basic Case of a Two-Step Hydrocracking Process Comprising No Hydrogenation Step A hydrocracking unit treats a vacuum gas oil (VGO) feedstock described in Table 1:

TABLE 1

| Type | | VGO |
|---|---|---|
| Flow rate | t/h | 37 |
| Density | — | 0.93 |
| Initial boiling point (IBP) | ° C. | 320 |

TABLE 1-continued

| Type | | VGO |
|---|---|---|
| Final boiling point (FBP) | ° C. | 579 |
| S content | wt % | 2.71 |
| N content | ppm by weight | 1510 |

The VGO feedstock is injected into a preheating stage and then into a hydrotreating reactor under the following conditions set out in Table 2:

TABLE 2

| Reactor | | R1 |
|---|---|---|
| Temperature | ° C. | 375 |
| Total pressure | MPa | 14 |
| Catalyst | — | NiMo on alumina |
| HSV | h$^{-1}$ | 1.67 |

The effluent from this reactor is subsequently injected into a second "hydrocracking" reactor R2 operating under the conditions of Table 3:

TABLE 3

| Reactor | | R2 |
|---|---|---|
| Temperature | ° C. | 390 |
| Total pressure | MPa | 14 |
| Catalyst | — | Metal/zeolite |
| HSV | h$^{-1}$ | 3 |

R1 and R2 constitute the first hydrocracking step, the effluent from R2 is then sent to a separation step composed of a train for recovery of heat and then for high-pressure separation including a recycle compressor and making it possible to separate, on the one hand, hydrogen, hydrogen sulfide and ammonia and, on the other hand, the liquid hydrocarbon effluent feeding a stripper and then an atmospheric distillation column in order to separate streams concentrated in H$_2$S, a petroleum cut, a middle distillates (kerosene and gas oil) cut, and an unconverted heavy liquid fraction (UCO). A purge corresponding to 2% by weight of the flow rate of the VGO feedstock is taken as distillation bottoms from said unconverted heavy liquid fraction.

Said unconverted heavy liquid fraction is injected into a hydrocracking reactor R3 constituting the second hydrocracking step. This reactor R3 is used under the following conditions set out in Table 4:

TABLE 4

| Reactor | | R3 |
|---|---|---|
| Temperature (TR2) | ° C. | 340 |
| Total pressure | MPa | 14 |
| Catalyst | — | Metal/zeolite |
| HSV | h$^{-1}$ | 2 |

This second hydrocracking step is carried out in the presence of 200 ppm of equivalent sulfur and 10 ppm of equivalent nitrogen, which originate from the H$_2$S and NH$_3$ present in the hydrogen and from the sulfur- and nitrogen-containing compounds still present in said unconverted heavy liquid fraction.

The effluent from R3 resulting from the second hydrocracking step is subsequently injected into the high-pressure separation step downstream of the first hydrocracking step then into the distillation step.

Example No. 2 in Accordance with the Invention

Example 2 is in accordance with the invention in so far as it is a two-step hydrocracking process (according to Example 1) in which a step of hydrogenation in the presence of a hydrogenation catalyst consisting of Ni and of an alumina support is carried out upstream of the second hydrocracking step in a hydrogenation reactor RH and in which the temperature TR1 in the hydrogenation step is at least 10° C. below the temperature TR2 of the second hydrocracking step.

The hydrotreating step in R1, first hydrocracking step in R2 and second hydrocracking step in R3 are carried out on the same feedstock and under the same conditions as in Example 1. A purge corresponding to 2% by weight of the flow rate of the VGO feedstock is also taken as distillation bottoms from the unconverted heavy liquid fraction.

The unconverted heavy liquid fraction resulting from the distillation is sent to a hydrogenation step carried out in a reactor RH placed upstream of a hydrocracking reactor R3 in which the second hydrocracking step is carried out. In this case, the temperature TR1 in the hydrogenation step is 60° C. below the temperature TR2 of the second hydrocracking step.

The operating conditions of the hydrogenation step in the hydrogenation reactor RH used upstream of the hydrocracking reactor R3 are set out in Table 5.

TABLE 5

| Reactor | | RH |
|---|---|---|
| Temperature (TR1) | ° C. | 280 |
| Total pressure | MPa | 14 |
| Catalyst | — | Ni/Alumina |
| HSV | h$^{-1}$ | 2 |

The catalyst used in the reactor RH has the following composition: 28 wt % Ni on gamma alumina.

The hydrogenated effluent resulting from RH is then sent to the second hydrocracking step carried out in the reactor R3 before being sent to the high-pressure separation then being recycled to the distillation step.

Example No. 3 not in Accordance with the Invention

Example 3 is not in accordance with the invention in so far as it is a two-step hydrocracking process (according to Example 1) in which a step of hydrogenation in the presence of a hydrogenation catalyst comprising Pt and an alumina support is carried out upstream of the second hydrocracking step in a hydrogenation reactor RH and in which the temperature TR1 in the hydrogenation step is equal to the temperature TR2 of the second hydrocracking step.

The hydrotreating step in R1, first hydrocracking step in R2 and second hydrocracking step in R3 are carried out on the same feedstock and under the same conditions as in Example 1. A purge corresponding to 2% by weight of the flow rate of the VGO feedstock is also taken as distillation bottoms from the unconverted heavy liquid fraction.

The unconverted heavy liquid fraction resulting from the distillation is sent to a hydrogenation step carried out in a reactor RH placed upstream of a hydrocracking reactor R3 in which the second hydrocracking step is carried out. In this case, the temperature TR1 in the hydrogenation step is equal to the temperature TR2 of the second hydrocracking step and is 340° C.

The operating conditions of the hydrogenation step in the hydrogenation reactor RH used upstream of the hydrocracking reactor R3 are set out in Table 6.

TABLE 6

| Reactor | | RH |
|---|---|---|
| Temperature (TR1) | ° C. | 340 |
| Total pressure | MPa | 14 |
| Catalyst | — | Pt/Alumina |
| HSV | h$^{-1}$ | 2 |

The catalyst used in the reactor RH has the following composition: 0.3 wt % Pt on gamma alumina.

The hydrogenated effluent resulting from RH is then sent to the second hydrocracking step carried out in the reactor R3 before being sent to the high-pressure separation then being recycled to the distillation step.

Example No. 4 not in Accordance with the Invention

Example 4 is not in accordance with the invention in so far as it is a two-step hydrocracking process (according to Example 1) in which a step of hydrogenation in the presence of a hydrogenation catalyst comprising Pt and an alumina support is carried out upstream of the second hydrocracking step in a hydrogenation reactor RH and in which the temperature TR1 in the hydrogenation step is at least 10° C. below the temperature TR2 of the second hydrocracking step.

The hydrotreating step in R1, first hydrocracking step in R2 and second hydrocracking step in R3 are carried out on the same feedstock and under the same conditions as in Example 1. A purge corresponding to 2% by weight of the flow rate of the VGO feedstock is also taken as distillation bottoms from the unconverted heavy liquid fraction.

The unconverted heavy liquid fraction resulting from the distillation is sent to a hydrogenation step carried out in a reactor RH placed upstream of a hydrocracking reactor R3 in which the second hydrocracking step is carried out. In this case, the temperature TR1 in the hydrogenation step is 60° C. below the temperature TR2 of the second hydrocracking step.

The operating conditions of the hydrogenation step in the hydrogenation reactor RH used upstream of the hydrocracking reactor R3 are set out in Table 7.

TABLE 7

| Reactor | | RH |
|---|---|---|
| Temperature (TR1) | ° C. | 280 |
| Total pressure | MPa | 14 |
| Catalyst | — | Pt/Alumina |
| HSV | h$^{-1}$ | 2 |

The catalyst used in the reactor RH has the following composition: 0.3 wt % Pt on gamma alumina.

The hydrogenated effluent resulting from RH is then sent to the second hydrocracking step carried out in the reactor R3 before being sent to the high-pressure separation then being recycled to the distillation step.

Example No. 5 in Accordance with the Invention

Example 5 is in accordance with the invention in so far as it is a two-step hydrocracking process (according to Example 1) in which a step of hydrogenation in the presence of a hydrogenation catalyst consisting of Ni and of an alumina support is carried out upstream of the second hydrocracking step in a hydrogenation reactor RH and in which the temperature TR1 in the hydrogenation step is at least 10° C. below the temperature TR2 of the second hydrocracking step.

The hydrotreating step in R1, first hydrocracking step in R2 and second hydrocracking step in R3 are carried out on the same feedstock and under the same conditions as in Example 1. This time, a purge corresponding to 1% by weight of the flow rate of the VGO feedstock is taken as distillation bottoms from the unconverted heavy liquid fraction.

The unconverted heavy liquid fraction resulting from the distillation is sent to a hydrogenation step carried out in a reactor RH placed upstream of a hydrocracking reactor R3 in which the second hydrocracking step is carried out. In this case, the temperature TR1 in the hydrogenation step is 60° C. below the temperature TR2 of the second hydrocracking step.

The operating conditions of the hydrogenation step in the hydrogenation reactor RH used upstream of the hydrocracking reactor R3 are set out in Table 8.

TABLE 8

| Reactor | | RH |
|---|---|---|
| Temperature (TR1) | ° C. | 280 |
| Total pressure | MPa | 14 |
| Catalyst | — | Ni/Alumina |
| HSV | h$^{-1}$ | 2 |

The catalyst used in the reactor RH has the following composition: 28 wt % Ni on gamma alumina.

The hydrogenated effluent resulting from RH is then sent to the second hydrocracking step carried out in the reactor R3 before being sent to the high-pressure separation then being recycled to the distillation step.

Example 6—Process Performance

Table 9 summarizes the performance of the processes described in Examples 1 to 5 in terms of yield of middle distillates, cycle time of the process and overall conversion of the process. The conversion of coronene (HPNA with 7 aromatic rings) carried out in the hydrogenation step is also reported.

TABLE 9

| Examples | 1 (not in accordance with the invention) | 2 (in accordance with the invention) | 3 (not in accordance with the invention) | 4 (not in accordance with the invention) | 5 (in accordance with the invention) |
|---|---|---|---|---|---|
| Catalyst in RH | — | 28% Ni/alumina | 0.3% Pt/alumina | 0.3% Pt/alumina | 28% Ni/alumina |
| Purge (%) | 2 | 2 | 2 | 2 | 1 |
| TR1 (° C.) | — | 280 | 340 | 280 | 280 |
| TR2 (° C.) | 340 | 340 | 340 | 340 | 340 |
| Coronene conversion (%)(1) | 0 | 81 | 4 | 60 | 81 |
| Yield of middle distillates | Base | Base | Base | Base | Base + 1 point |
| Cycle time | Base | Base + 6 months | Base + 1 month | Base + 3 months | Base + 4 months |
| Overall conversion (%) | 98 | 98 | 98 | 98 | 99 |

The coronene conversion is calculated by dividing the difference in the amounts of coronene measured upstream and downstream of the hydrogenation reactor by the amount of coronene measured upstream of this same reactor. The amount of coronene is measured by high-pressure liquid chromatography coupled to a UV detector (HPLC-UV), at a wavelength of 302 nm for which coronene has a maximum absorption.

These examples illustrate the advantage of the process according to the invention which makes it possible to obtain improved performance in terms of cycle time, yield of middle distillates or overall conversion of the process.

Thus, with the process of Example 2 in accordance with the invention using a hydrogenation reactor upstream of the second hydrocracking step, the cycle time is lengthened by 6 months relative to a process without a hydrogenation reactor (illustrated by Example 1). Specifically, at 280° C., the Ni/alumina hydrogenation catalyst makes it possible to greatly convert the HPNAs. The deactivation of the catalyst of the second hydrocracking step is therefore slowed down, which allows a longer cycle. Furthermore, the cycle time is longer than that obtained with a hydrogenation catalyst based on Pt (Examples 3 and 4 not in accordance with the invention), owing to the lower hydrogenation temperature and the better resistance of the Ni to the sulfur-containing compounds still present in the unconverted heavy fraction. Example 5 in accordance with the invention illustrates that the process according to the invention also makes it possible to reduce the degree of purge, since the HPNAs are hydrogenated in the hydrogenation reactor, which leads to an increase in the overall conversion and in the yield of middle distillates, while retaining a lengthened cycle time.

The invention claimed is:

1. A process producing middle distillates from hydrocarbon feedstocks containing at least 20% by volume of compounds boiling above 340° C., said process comprising at least the following:

a) hydrotreating said feedstocks in the presence of hydrogen and at least one hydrotreating catalyst, at a temperature of 200° C. to 450° C., under a pressure of 2 to 25 MPa, at a space velocity of 0.1 to 6 h$^{-1}$ and with an amount of hydrogen introduced such that the litre of hydrogen/litre of hydrocarbon volume ratio is 100 to 2000 Nl/l, b) hydrocracking at least one portion of the effluent resulting from a), hydrocracking b) taking place, in the presence of hydrogen and at least one hydrocracking catalyst, at a temperature of 250° C. to 480° C., under a pressure of 2 to 25 MPa, at a space velocity of 0.1 to 6 h$^{-1}$ and with an amount of hydrogen introduced such that the litre of hydrogen/litre of hydrocarbon volume ratio is 80 to 2000 Nl/l, c) high-pressure separation of effluent resulting from hydrocracking b) to produce at least a gaseous effluent and a liquid hydrocarbon effluent, d) distilling at least one portion of the liquid hydrocarbon effluent resulting from c) carried out in at least one distillation column, from which the following are drawn off:
  a gaseous fraction,
  at least one petroleum fraction having at least 80% by volume of products boiling at a temperature below 150° C.,
  at least one middle distillates fraction having at least 80% by volume of products having a boiling point 150° C. to 380° C.,
  an unconverted heavy liquid fraction having at least 80% by volume of products having a boiling point above 350° C., e) optionally purging of at least one portion of said unconverted heavy liquid fraction containing HPNAs, having at least 80% by volume of products having a boiling point above 350° C., before the introduction thereof into f), f) hydrogenating at least one portion of the unconverted heavy liquid fraction having at least 80% by volume of products having a boiling point above 350° C. resulting from d) and optionally purged, f) taking place, in the presence of hydrogen and a hydrogenation catalyst, at a temperature TR1 of 150° C. to 470° C., under a pressure of 2 to 25 MPa, at a space velocity of 0.1 to 50 h$^{-1}$ and with an amount of hydrogen introduced such that the litre of hydrogen/litre of hydrocarbon volume ratio is 100 to 4000 Nl/l, said hydrogenation catalyst comprising at least one non-noble metal from group VIII of the Periodic Table that is nickel, cobalt, iron, or a mixture thereof, and not comprising any noble metal from group VIII or metal from group VIB, and a refractory oxide support, g) a second hydrocracking at least one portion of effluent resulting from f), g) taking place, in the presence of hydrogen and at least one second hydrocracking catalyst, at a temperature TR2 of 250° C. to 480° C., under a pressure of 2 to 25 MPa, at a space velocity of 0.1 to 6 h$^{-1}$ and with an amount of hydrogen introduced such that the litre of hydrogen/litre of hydrocarbon volume ratio is 80 to 2000 Nl/l, and in which the temperature TR2 is at least 10° C. higher than the temperature TR1, h) high-pressure separation of effluent resulting from the hydrocracking g) to produce at least a gaseous effluent and a liquid hydrocarbon effluent, i) recycling, to distillation d), at least one portion of the liquid hydrocarbon effluent resulting from h).

2. The process according to claim 1, in which said hydrocarbon feedstocks are VGOs, vacuum distillates (VDs), gas oils, feedstocks originating from units for the extraction of aromatics from lubricating oil bases or resulting from the solvent dewaxing of lubricating oil bases, distillates originating from the desulfurization or hydroconversion of ATRs (atmospheric residues) and/or VRs (vacuum residues), or from deasphalted oils, feedstocks resulting from biomass or any mixture of the abovementioned feedstocks.

3. The process according to claim 1, in which hydrotreating a) takes place at a temperature of 300° C. to 430° C., under a pressure of 5 to 20 MPa, at a space velocity of 0.2 to 5 h$^{-1}$ and with an amount of hydrogen introduced such that the litre of hydrogen/litre of hydrocarbon volume ratio is 300 to 1500 Nl/l.

4. The process according to claim 1, in which hydrocracking b) takes place at a temperature of 330° C. to 435° C., under a pressure of 3 to 20 MPa, at a space velocity of 0.2 to 4 h$^{-1}$ and with an amount of hydrogen introduced such that the litre of hydrogen/litre of hydrocarbon volume ratio is 200 to 2000 Nl/l.

5. Process according to claim 1, in which hydrogenation f) takes place at a temperature TR1 of 180° C. to 320° C., under a pressure of 9 to 20 MPa, at a space velocity of 0.2 to 10 h$^{-1}$ and with an amount of hydrogen introduced such that the litre of hydrogen/litre of hydrocarbon volume ratio is 200 to 3000 Nl/l.

6. The process according to claim 1, in which said hydrocracking g) takes place at a temperature TR2 of 320° C. to 450° C., under a pressure of 9 to 20 MPa, at a space velocity of 0.2 to 3 h$^{-1}$ and with an amount of hydrogen introduced such that the litre of hydrogen/litre of hydrocarbon volume ratio is 200 to 2000 Nl/l.

7. The process according to claim 1, in which g) is carried out at a temperature TR2 at least 20° C. higher than the temperature TR1.

8. The process according to claim 7, in which g) is carried out at a temperature TR2 at least 50° C. higher than the temperature TR1.

9. The process according to claim 8, in which g) is carried out at a temperature TR2 at least 70° C. higher than the temperature TR1.

10. The process according to claim 1, in which hydrogenation f) is carried out in the presence of a catalyst comprising nickel and alumina.

11. The process according to claim 2, wherein the feedstock is gas oils resulting from the direct distillation of crude or from conversion units.

12. The process according to claim 11, wherein the conversion units are FCC, coker or visbreaking units.

13. The process according to claim 10, in which the catalyst consists of nickel and alumina.

* * * * *